United States Patent [19]

Coe et al.

[11] Patent Number: 4,825,680

[45] Date of Patent: May 2, 1989

[54] METHOD OF MANUFACTURING METAL SUBSTRATES FOR DISK FOR MEMORY STORAGE MEDIA

[75] Inventors: Thomas U. Coe, Saratoga, Calif.; Atsushi Yamazaki, Tochigi, Japan

[73] Assignees: Furukawa Aluminum Co., Ltd., Tokyo; Kawasaki Steel Corp., Hyogo; C. Itoh & Co., Ltd., Osaka, all of Japan

[21] Appl. No.: 110,765

[22] PCT Filed: Jan. 5, 1987

[86] PCT No.: PCT/JP87/00001

§ 371 Date: Oct. 27, 1987

§ 102(e) Date: Oct. 27, 1987

[87] PCT Pub. No.: WO87/04093

PCT Pub. Date: Jul. 16, 1987

[30] Foreign Application Priority Data

Dec. 28, 1985 [JP] Japan .................................. 60-297594
Dec. 28, 1985 [JP] Japan .................................. 60-297595

[51] Int. Cl.⁴ .............................................. B21D 1/00
[52] U.S. Cl. ........................................ 72/359; 72/352; 72/374; 72/377; 360/135
[58] Field of Search ................. 72/352, 354, 359, 335, 72/373, 374, 375, 376, 379, 336, 377; 427/130; 360/135

[56] References Cited

U.S. PATENT DOCUMENTS

| | | | |
|---|---|---|---|
| 2,858,607 | 11/1958 | Hermann | 72/376 |
| 2,972,183 | 2/1961 | Greenshields | 29/DIG. 18 |
| 3,145,455 | 8/1964 | Faleske | 72/376 |
| 3,196,660 | 7/1965 | Olson | 72/376 |
| 3,761,333 | 9/1973 | Kleinbeck | 360/135 X |
| 3,797,035 | 3/1974 | Hunt | 360/135 |
| 3,808,079 | 4/1974 | Akashi | 360/135 X |
| 3,845,651 | 11/1974 | Vau | 72/332 |
| 3,886,052 | 5/1975 | Smith | 360/135 X |
| 4,029,541 | 6/1977 | Barlow | 360/135 X |
| 4,030,138 | 6/1977 | Hilier | 360/135 |
| 4,069,360 | 1/1978 | Yanagisawa | 360/135 X |
| 4,071,360 | 1/1978 | Mannino | 72/376 |
| 4,403,494 | 9/1983 | NcCullough | 72/360 |
| 4,430,387 | 2/1984 | Nakagawa | 360/135 X |
| 4,520,647 | 6/1985 | Economy et al. | 72/365 |
| 4,525,759 | 6/1985 | Valayil | 360/135 |
| 4,588,653 | 5/1986 | Wray | 428/600 |
| 4,711,115 | 12/1987 | Sukonnik et al. | 72/329 |

FOREIGN PATENT DOCUMENTS

| | | | |
|---|---|---|---|
| 127523 | 8/1982 | Japan | 72/379 |
| SP880529 | 12/1987 | Japan | . |
| SP880531 | 12/1987 | Japan | . |

OTHER PUBLICATIONS

Metals Handbook (1948 Edition), "Coining", pp. 42–43.
IBM Technical Disclosure Bulletin, vol. 23, No. 1, Jun. 1980, p. 306, M. F. Doerner, "Magnetic Recording Disk With High Start/Stop Durability and Low Magnetic Errors".
IBM Technical Disclosure Bulletin, vol. 23, No. 9, Feb. 1981, pp. 4032–4033; A. T. Fletcher; "Diskette Marking".
IBM Technical Disclosure Bulletin, vol. 26, No. 3A, Aug. 1983, pp. 1208–1209, W. H. Bachman; "Magnetic Disk Container".

Primary Examiner—David Jones
Attorney, Agent, or Firm—Townsend and Townsend

[57] ABSTRACT

A method for manufacturing a metal substrate for a memory disk wherein a metal blank material (6) is sandwiched between two dies within a metal mould (3) limiting the extent to which the material spreads, using a core member (4) if necessary, each of the dies having a flat and smooth working surface, the compression force and sheet gauge reduction ratio being regulated or the surface roughness and amount of coating lubricants employed being regulated.

1 Claim, 1 Drawing Sheet 4,825,680

METHOD OF MANUFACTURING METAL SUBSTRATES FOR DISK FOR MEMORY STORAGE MEDIA

TECHNICAL FIELD

The present invention relates to a method of manufacturing, from a metal blank material, metal substrates for memory disks with ultra-precisely formed smooth and flat surfaces. Metal blank as herein referred to shall mean a non-magnetic metal blank material which is made of aluminum, an aluminum alloy, copper, a copper alloy, magnesium, a magnesium alloy, titanium, a titanium alloy, austenite stainless steel or composites thereof, and metal substrates shall have a similar meaning.

BACKGROUND OF INVENTION

Conventionally, memory disks which are used to record and reproduce various types of information (letters, sounds and images, etc.) are composed of doughnut type metal substrates, the surfaces of which are finished with ultra precision, the substrate being, for instance( an aluminum alloy substrate sheet (substrate) covered with a magnetic substance. In order to precisely perform its duty of allowing recording and reproducing by the magnetic head, the surface of a memory disk is required to have a high degree of flatness and smoothness. Since the surface condition of a memory disk is dependent on the surface condition of its metal substrate, the metal substrate is required to have extremely high dimensional preciseness (flatness, such as the minimum possible amount of undulation and warping) and a high quality surface condition (defect-free, mirror-like smoothness).

Conventionally, there exist a number of ways of making these metal substrates for memory disks, for instance, (a) a process wherein machining is carried out ultra-precisely by a natural diamond bit, (b) a process wherein both sides are simultaneously ground with grinding stones, and (c) a process wherein both sides are polished with abrasive grains and hot water by use of a lapping machine. However, since all of the above processes require machining or grinding, problems have been experienced in that they involve a great deal of time resulting n low productivity and also in that they require many production facilities.

SUMMARY OF INVENTION

The present invention, in consideration of the problems inherent in the conventional technology, offers a method of manufacturing a metal substrate for a memory disk, the quality of which is, at the very least, superior to that obtainable by the conventional technology and yet offering high productivity by use of a coining operation performed with a press. Coining work is a type of technology that is normally used in making coins, and it has generally been practiced in such a manner that the object material is pressed with dies having indentations and protrusions forming a design which when compressed against the relevant surfaces form corresponding protrusions and indentations on the surface of the material to be worked. The present invention is different from the normal coining in which a design is formed in this way; the invention offers a method of manufacturing metal substrates for memory disks by using dies with flat and smooth compressing surfaces and by performing a coining operation on the material with these smooth and flat compressing surfaces of the dies and simultaneously finishing both sides of a substrate with ultra precision.

That is to say, in the manufacturing method of the present invention, a metal blank is sandwiched between two flat pressing surfaces of dies within a metal ring member so that the extent to which the material spreads is restricted and is thus subjected to a coining operation. In this case, a core member may be employed as necessary.

The reason why the coining operation on the blank material is performed within the metal mould that restricts the spreading of the blank metal is that, under this restriction of the material's tendency to spread, it becomes easy to impress the precisely finished die surface onto the surface of a product, and as a result, it is made possible to obtain a formed product with excellent surface precision (smoothness). Furthermore, by performing coining in the above manner, the process is capable of obtaining a formed product with outside and inside diameters having high dimensional preciseness.

The inventors of the present invention realized that the following factors are closely related to the desired result in the coining process of the present invention, namely:

the strength of the metal blank and the coining pressure;

the surface roughness of the metal blank and the lubricant;

the sheet gauge reduction ratio (to be explained later); and the surface roughness of the pressing surfaces of the dies; etc.

It was found to be preferable for obtaining metal substrates for memory disks having superior surface characteristics that, in the coining process, the pressure of the dies be held below 5 times the tensile strength of the metal blank and the sheet gauge reduction ratio be held below 4%.

The reason why the compressing force or pressure P (kg/mm$^2$) of the dies is held below 5 times the tensile strength $\sigma B$ (kg/mm$^2$) of a metal blank material is that when the pressure exceeds 5 times, the compressing force becomes excessive so that the divergence from the flatness in relation to such factors as undulation, warping and "differences in sheet gauge" would become large, thereby deteriorating the dimensional preciseness of the product substrates. Since this is a coining operation, it is naturally required that the compressing force of the dies be at least large enough to impress the smoothness and flatness of the dies on to a metal blank material. The lowest limit of this compressing force is normally about one half as much as the yield strength of a blank material in a boundary area beyond the elasticity limit (0.1% elongation) of the blank material.

The reason why the sheet gauge reduction ratio of a metal blank material is held below 4% is that, if the ratio is made over 4%, the flow of the blank material induced by the coining is made too large and causes an adverse effect in regard to undulations and warping in the product substrates. The sheet gauge reduction ratio "m" is obtained by the following equation:

$$m = \frac{t_o - t}{t_o} \times 100\%$$

wherein, $t_o$: sheet gauge before coining (mm)

$t$: sheet gauge after coining (mm)

In a case where the metal blank is an annular or doughnut shape, the sheet gauge reduction ratio is dependent on the difference between the diameters of a ring member and a core member and a metal blank. That is, the outside diameter of a blank material is made slightly smaller than the inside diameter of the ring and the inside diameter of the blank material is made slightly larger than the outside diameter of the core member. Upon coining this blank material, the area of the metal blank spreads outwardly and inwardly thus reducing the sheet gauge; however, the spreading of the metal blank is restricted by the ring member and the core member, so the sheet gauge will not be reduced any further beyond a point where the et al blank material spreads to fill the inside clearance of the ring member and the outside clearance of the core member. Therefore in order to adjust the sheet gauge reduction ratio, it is required to change the inner and outer diameters of the metal blank if the outer diameter of the core member and the inner diameter of the ring are kept constant. If the blank material is a circular disk, consideration similar to the above will have to be paid to the size in regard to the outer diameter thereof only.

Metal blank material as herein referred to shall mean Al, an Al alloy, Cu, a Cu alloy, Mg, a Mg alloy, Ti, a Ti alloy, an austenite stainless steel material, or composites thereof and it is possible to apply the technology of the present invention to all of these materials. For instance, it is possible by the coining process to easily obtain surfaces of high precision on material made of pure aluminum and Cu, etc. clad with high strength alloy, which is difficult to machine and grind. The reason why it is favorable to use a pure metal on the surface of a substrate is because it can be free from defects in the material and also it is possible to obtain favorable results in post treatments such as Ni plating or anodizing, etc. Furthermore, it is possible to apply the present invention to a composite material such as an aluminum alloy clad with an austenite stainless steel sheet, which is hard material.

In the process of the present invention, the compressing force $P$ (kg/mm$^2$) of the dies is kept below 5 times the tensile strength $\sigma B$ (kg/mm$^2$) of the blank material; however, in a case where the blank material is a composite material, the average tensile strength of that composite material components needs to be considered.

It was also found to be preferable for the surface roughness of the metal blank to be kept less than Rmax 20 $\mu$m and for the coating amount of lubricant to be kept less than 1000 mg/m$^2$.

The reason why the amount of lubricant coated is kept less than 1000 mg/m$^2$ is that, although it is favorable to increase the amount of lubricant in order to prevent "build-up" (sticking of material to the die), too much of the lubricant existing between the blank and compressing surfaces beyond a level of 1000 mg/m$^2$ may deteriorate the surface roughness of a product metal substrate. The lubricant may either be non-water soluble or water soluble. It is recommended that a lubricant of high viscosity (heavy specific gravity) be coated in smaller quantities and a lubricant of low viscosity (small specific gravity) in larger quantities, always keeping the coating amount on the blank surface under 1000 mg/m$^2$.

It is preferable to use a lubricant having a kinematic viscosity of less than 3 (20° C. cst) and a film strength of more than 5 kg/cm$^2$ (4-ball type load test at 200 rpm).

If a lubricant having a larger kinematic viscosity is employed, it tends to deteriorate the surface roughness of the metal substrate after coining, and if a lubricant having smaller film strength is coated, it tends to easily create build-up.

The reason why the surface roughness of a metal blank material is kept below 20 $\mu$m is that if it exceeds 20 $\mu$m, not only does the surface roughness of the finished metal blank for a memory disk deteriorate but build-up is also easily created.

A memory disk has a doughnut shape in its final form; however the disk may be produced by coining either a blank material with a doughnut shape or one with a disk shape, the inner hole in the latter being punched out after the coining so that it may be given a doughnut shape.

According to the method of the present invention, blank materials are worked while plastic simultaneously with the transference onto the surfaces thereof of the state of the compressing surfaces of the dies. For this reason, the compressing surfaces of the dies are quite finely finished.

Also according to the present invention, it is possible by performing a coining operation on a metal blank to obtain surface precision (flatness and smoothness) which is at least equivalent to or better than those made by the conventional process. Moreover, it is possible to finish opposite surfaces at the same time.

Therefore, compared with the conventional machining and grinding methods, it is made possible in the present invention to greatly reduce the number of production steps whereby the production of substrates for memory disks may be achieved with an exceptionally high rate of productivity.

Incidentally, the metal substrates produced according to the present invention may be utilized not only for magnetic recording systems but also for optical recording 5 systems.

BEST MODE FOR PRACTICING INVENTION

Figure 1:
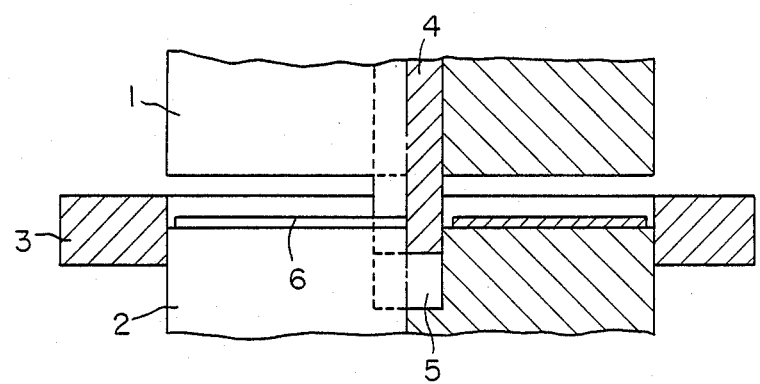
FIG. 1 is an explanatory drawing of dies which are employed in performing the coining operation on a doughnut-shaped blank according to the present invention.
Figure 2:
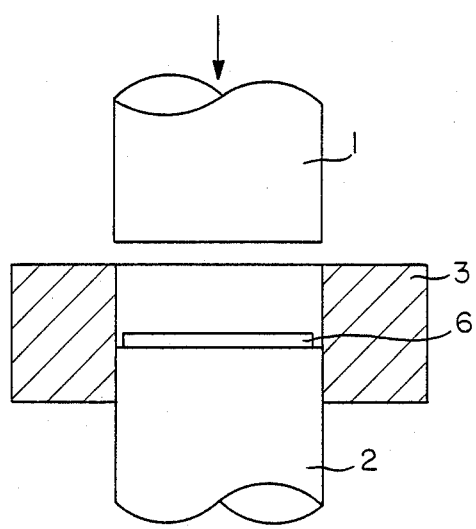
FIG. 2 is an explanatory drawing of a coining apparatus for coining a disk blank according to the present invention.

In order to limit the spreading of the material, a metal blank 6 is subjected to the coining operation between two dies 1 and 2 having flat compressing surfaces within a combination of a metal ring member 3 and a core member 4, as shown in FIG. 1, in the case where the blank has a doughnut shape and within a metal ring member 3, as shown in FIG. 2 in the case where the blank has a disk shape.

The embodiments of the present invention were performed employing the apparatus shown in FIG. 2 and disk shaped blanks. (Preliminarily, a comparison test was conducted by coining disk-shaped blanks and doughnut-shaped blanks, both having the same outer diameters (approximately 65 mm) and the latter having an inner diameter of approximately 15 mm. However, the results revealed that there was no substantial difference between the two with respect to the characteristic factors of the test. Therefore, the results achieved with the disk-shaped blanks will be described hereinafter.

The disk blank was made from 5086-O temper aluminum alloy material (Al-Mg alloy, tensile strength $\sigma B = 27$ kg/mm$^2$), sheet gauge 1.5 mm. The outer diameter of the blank material was arranged so that the sheet gauge reduction ratio was 1% relative to the inner diameter of a ring member of the coining apparatus, the inner diameter of the ring member being 65 mm. The surface roughness of the blank material was 1.50 μm Rmax (an average of 5 locations). The compressing surfaces of the dies were flat and their surface roughness was Rmax 0.20 μm (an average of 5 locations). Lubricant of 50 mg/cm$^2$ was applied on the opposite surfaces of the blank. The lubricant G 6311 (viscosity: 1.0, 20° C. cst, oil film strength: 10 kg/cm$^2$) produced by Nippon Machining Oil Co. was used.

Under these conditions, coining operations were performed by changing the compressing force of the dies. The results are shown in Table 1.

TABLE 1

| Compressing force P mg/mm$^2$ (multiples of $\sigma B$) | Quality of formed products | | | | No. of pieces until build-up was encountered |
|---|---|---|---|---|---|
| | Undulation μm | Warping μm | Sheet gauge diff. μm | Surface roughness Rmax μm | |
| 27 (1 Mag.) | 5 | 1.0 | 10 | 0.24 | 2000 |
| 54 (2 Mag.) | 7 | 1.4 | 12 | 0.21 | 2000 |
| 81 (3 Mag.) | 10 | 1.5 | 12 | 0.22 | 1900 |
| 108 (4 Mag.) | 16 | 1.7 | 15 | 0.23 | 1900 |
| 135 (5 Mag.) | 18 | 1.8 | 17 | 0.22 | 1900 |
| 162 (6 Mag.) | 30 | 12.0 | 55 | 0.23 | 1500 |
| 189 (7 Mag.) | 33 | 12.5 | 57 | 0.21 | 1500 |
| 216 (8 Mag.) | 34 | 13.2 | 60 | 0.23 | 1400 |
| 243 (9 Mag.) | 33 | 13.0 | 61 | 0.22 | 1300 |
| 270 (10 Mag.) | 36 | 13.5 | 60 | 0.23 | 1200 |

Remarks: Mag is magnification

It was observed that the surface gloss was satisfactory on all of the formed products.

Incidentally, the conditions of the test are noted below.

"Compressing force P" is a quotient of the compressing force at the time of coining divided by the surface area of the blank material;

"Undulation" is the difference between the maximum value and the minimum value measured by a profilometer with one revolution tracing on a circle of 50 mm diameter on the coined disk;

"Warping" is a mean value of variables measured along the measuring length of 55 mm at four locations (45° apart) by measuring the deviation from the reference line extending between the starting and terminal points of measurement;

"Sheet gauge difference" is the difference between the maximum thickness and the minimum thickness among the values measured at ten locations;

"Surface roughness" is the mean value of those measured at five positions; and

"Surface gloss" is a judgement based on visual observation.

All of the data given above were attained by using in every case 10 samples of the disks produced.

The value for build-up (sticking of material to the compressing surface of a die) was determined by observing the compressing surface every time 100 pieces had been coined continuously. For instance, a value of 2000 for build-up means that build-up had not occurred after coining 2000 pieces but was detected after coining 2100 pieces.

According to the results mentioned above, it is apparent that, by performing a coining operation, the surface state of the compressing surface of a die may be impressed onto the blank material so that a finished product of good surface roughness and gloss can be obtained. In particular, if the compressing force P is arranged to be below 5 times the tensile strength $\sigma B$ of a blank material, undulation, warping and differences in sheet gauge are all reduced and it is thus clear that the present invention is suitable for manufacturing metal substrates for memory disks. It is to be noted that the arrangement whereby the compressing force P is kept less than 5 times the tensile strength enables the dies to produce many pieces before any build-up is detected, thereby contributing to higher productivity.

Next, in order to review the influence of changes in the sheet gauge reduction ratio, the compressing force P was kept constant at 81 kg/mm$^2$ (3 times $\sigma B$) and an experiment was conducted while changing the sheet gauge reduction ratio. The results are shown in Table 2.

TABLE 2

| Sheet gauge reduction ratio m % | Quality of formed products | | | | No. of pieces until build-up was encountered |
|---|---|---|---|---|---|
| | Undulation μm | Warping μm | Sheet gauge diff. μm | Surface roughness Rmax μm | |
| 0.5 | 6 | 1.2 | 11 | 0.21 | 2000 |
| 1 | 10 | 1.5 | 12 | 0.22 | 1900 |
| 2 | 11 | 1.7 | 10 | 0.22 | 1900 |
| 2.9 | 13 | 1.9 | 12 | 0.23 | 1900 |
| 3.4 | 12 | 2.0 | 13 | 0.24 | 1800 |
| 4.8 | 34 | 10.1 | 32 | 0.29 | 1600 |
| 5.7 | 37 | 13.2 | 35 | 0.30 | 1600 |
| 6.5 | 39 | 14.1 | 37 | 0.32 | 1600 |
| 7.4 | 40 | 17.9 | 36 | 0.33 | 1500 |
| 9.1 | 42 | 19.0 | 40 | 0.33 | 1500 |

As to the surface gloss of the formed products, they were found to be fine in general; however some "blur" was observed in the ones listed in the bottom three lines of the above table.

It was found according to the results above that if the sheet gauge reduction ratio is kept below 4%, the degree of undulation and warping and the difference in sheet gauge of the formed products are all reduced.

Next, compressing force P was arranged to be 5 times the tensile strength $\sigma B$, and sheet gauge reduction ratio was arranged to be 3.4%. This showed almost satisfactory results in that the values for undulation, warping, sheet gauge difference and surface roughness were 19 μm, 2.2 μm, 19 μm, and Rmax 0.24 μm, respectively, and the surface gloss was good.

It became clear from the above results that the surface roughness, which is an index representing the quality of metal substrates for memory disks, is least affected by the compressing force and sheet gauge reduction ratio. Additional studies were made on the factors which influence the surface roughness of a formed product. It was found that the amount of lubricant coated, the surface roughness of a blank material and the surface roughness of the compressing surfaces of a die are involved as contributory factors.

As to the influence of the amount of lubricant tests were conducted with the following factors kept constant, namely the compressing force P at 81 kg/mm$^2$ (3 times the σB), the sheet gauge reduction ratio at 1%, the surface roughness of the blank material at Rmax 1.50 μm (mean value of 5 locations) and the surface roughness of the compressing surfaces of a die at Rmax 0.20 μm (mean value at 5 locations). The results of these tests are indicated in Table 3. The lubricant was the same as that employed in the test shown in Tables 1 and 2.

TABLE 3

| Amount of lubricant coated kg/m² | Quality of formed products | | | | No. of pieces until build-up was encountered |
|---|---|---|---|---|---|
| | Undulation μm | Warping μm | Sheet gauge diff. μm | Surface roughness Rmax μm | |
| 50 | 10 | 1.5 | 12 | 0.22 | 1900 |
| 100 | 11 | 1.6 | 11 | 0.21 | 1900 |
| 200 | 13 | 1.6 | 13 | 0.22 | 1900 |
| 500 | 12 | 1.7 | 11 | 0.23 | 2000 |
| 900 | 13 | 1.6 | 13 | 0.24 | 2200 |
| 1500 | 14 | 1.5 | 13 | 0.60 | 2300 |
| 2000 | 13 | 1.7 | 12 | 0.67 | 2500 |
| 3000 | 14 | 1.8 | 13 | 0.72 | 3000 |
| 4000 | 12 | 1.7 | 13 | 0.88 | 3200 |
| 5000 | 13 | 1.5 | 12 | 0.99 | 3300 |

Surface gloss of products was satisfactory except some "blur" was observed on those listed in the 2nd line to the 5th line of the Table.

The measuring conditions were the same as those for the tests shown in Table 1.

It is apparent from the above results that state of a compressing die surface is transferred onto the blank material whereby products with the minimum degree of undulation, warping and sheet gauge differences can be obtained. Furthermore, the incidence of build-up may be reduced so that the number of products that can be coined before any build-up is encountered can be advantageously increased as the amount of lubricant coated is increased. However, if the amount of coating exceeds 1000 mg/m², the surface roughness of formed products will deteriorate. So, it is preferable that the amount of coating lubricant be less than 1000 mg/m² in the production of aluminum substrates for memory disks.

Next, in order to review the influence caused by variations in the surface roughness of a blank material, experiments were conducted by varying the surface roughness of a blank material with the amount of lubricant coated thereon kept constant at 50 mg/m² and also with the compressing pressure kept constant at 81 kg/mm² (3 times the σB). The results are shown in Table 4.

TABLE 4

| Surface roughness of blank material Rmax μm | Quality of formed products | | | | No. of pieces until build-up was encountered |
|---|---|---|---|---|---|
| | Undulation μm | Warping μm | Sheet gauge diff. μm | Surface roughness Rmax μm | |
| 1.5 | 10 | 1.5 | 12 | 0.22 | 1900 |
| 2.5 | 12 | 1.7 | 11 | 0.22 | 1900 |
| 5 | 13 | 1.6 | 13 | 0.23 | 1900 |
| 10 | 12 | 1.7 | 12 | 0.23 | 1900 |
| 17 | 14 | 1.6 | 11 | 0.24 | 1800 |
| 25 | 15 | 1.8 | 14 | 0.30 | 1500 |
| 30 | 17 | 1.7 | 14 | 0.35 | 1500 |
| 40 | 16 | 1.7 | 15 | 0.42 | 1400 |
| 50 | 16 | 1.8 | 16 | 0.47 | 1400 |
| 60 | 17 | 1.6 | 15 | 0.50 | 1400 |

The surface gloss of the products was observed to be satisfactory except that some "blur" was found on the products listed in the tests identified as Rmax 25–60.

It was found according to the results above that surface roughness of a formed product is kept in a good condition and that the number of products that can be coined before build-up is encountered can be increased if the surface roughness of the blank material is kept less than 20 μm.

Next, in a case where the amount of lubricant coated was arranged to be 900 mg/m², and the surface roughness of the blank material was arranged to be 17 μm, it was found that the surface roughness of a formed product was Rmax 0.23 μm and the number of products coined before build-up was observed reached 2100 pieces.

Aside from the above factors, the surface roughness of a formed product is naturally influenced by the surface roughness of the compressing surfaces of the dies employed. Similar experiments were conducted by keeping the amount of coating lubricant constant at 50 mg/m² and arranging the surface roughness of a blank material at 1.5 μm. The results are shown in Table 5.

TABLE 5

| Surface roughness of compressing surface of dies Rmax μm | Quality of formed products | | | | No. of pieces until build-up was encountered |
|---|---|---|---|---|---|
| | Undulation μm | Warping μm | Sheet gauge diff. μm | Surface roughness Rmax μm | |
| 0.15 | 9 | 1.4 | 11 | 0.16 | 1900 |
| 0.20 | 10 | 1.5 | 12 | 0.22 | 1900 |
| 0.50 | 11 | 1.5 | 13 | 0.52 | 1900 |
| 0.65 | 13 | 1.6 | 13 | 0.66 | 1900 |
| 0.80 | 12 | 1.6 | 12 | 0.82 | 1900 |
| 1.00 | 13 | 1.7 | 14 | 1.10 | 1900 |
| 1.50 | 14 | 1.6 | 13 | 1.55 | 1900 |
| 2.00 | 14 | 1.7 | 14 | 2.09 | 1900 |
| 3.00 | 15 | 1.7 | 14 | 3.07 | 1700 |
| 6.00 | 14 | 1.6 | 13 | 6.04 | 1600 |

The surfaces of the products formed were satisfactory except for the tests conducted with dies having a surface roughness of between 3.00 and 6.00 where some "blur" was observed.

According to these results, it is apparent that the surface roughness of a formed product is directly influenced by the compressing surfaces of the dies almost as they are, so the surface roughness of the compressing surfaces of dies may be determined in accordance with the surface roughness required for the product to be formed.

Incidentally, it also became apparent according to the results above that the indexes representing the quality of aluminum substrate for the memory disk, such as undulation, warping and sheet gauge difference, were least affected by the amount of coating lubricant, the surface roughness of the blank material and the surface roughness of the compressing surfaces of the dies. It can be seen in Tables 1 and 2 that the compressing force of dies (kg/mm²) and the sheet reduction ratio are the factors which have great influence on "undulation", "warping" and "sheet gauge difference" for the coined products.

Next, disk blanks were made from 1100-O aluminum sheet (pure aluminum, tensile strength σB = 9 kg/mm²), with a thickness of 1.5 mm. Experiments were conducted under the same conditions as mentioned above. The results are as follows.

TABLE 6

(Influence of Dies Pressure)

| Compressing force P kg/mm² (multiples of σB) | Quality of formed products | | | | No. of pieces until build-up encountered |
|---|---|---|---|---|---|
| | Undulation μm | Warping μm | Sheet gauge diff. μm | Surface roughness Rmax μm | |
| 9 (1 Mag.) | 4 | 0.9 | 9 | 0.23 | 1900 |
| 18 (2 Mag.) | 6 | 1.3 | 11 | 0.21 | 1900 |
| 27 (3 Mag.) | 10 | 1.5 | 12 | 0.24 | 1800 |
| 36 (4 Mag.) | 17 | 1.6 | 16 | 0.22 | 1800 |
| 45 (5 Mag.) | 18 | 1.8 | 17 | 0.23 | 1800 |
| 54 (6 Mag.) | 32 | 12.5 | 56 | 0.22 | 1500 |
| 63 (7 Mag.) | 33 | 12.6 | 58 | 0.22 | 1500 |
| 72 (8 Mag.) | 35 | 13.1 | 59 | 0.21 | 1300 |
| 81 (9 Mag.) | 34 | 13.0 | 60 | 0.24 | 1200 |
| 90 (10 Mag.) | 36 | 13.5 | 61 | 0.24 | 1100 |

TABLE 7

(Influence of Coating Amount of Lubricant)

| Application amount of lubricant kg/m² | Quality of formed products | | | | No. of pieces until build-up encountered |
|---|---|---|---|---|---|
| | Undulation μm | Warping μm | Sheet gauge diff. μm | Surface roughness Rmax μm | |
| 50 | 11 | 1.6 | 13 | 0.21 | 1900 |
| 100 | 10 | 1.7 | 11 | 0.21 | 1900 |
| 200 | 13 | 1.6 | 12 | 0.22 | 1900 |
| 500 | 13 | 1.7 | 12 | 0.23 | 1900 |
| 900 | 14 | 1.7 | 13 | 0.24 | 2100 |
| 1500 | 15 | 1.6 | 13 | 0.60 | 2200 |
| 2000 | 14 | 1.7 | 13 | 0.71 | 2400 |
| 3000 | 14 | 1.8 | 14 | 0.79 | 2900 |
| 4000 | 13 | 1.8 | 14 | 0.89 | 3000 |
| 5000 | 14 | 1.6 | 13 | 1.00 | 3200 |

TABLE 8

(Influence of Surface Roughness of a Blank Material)

| Surface roughness of blank material Rmax μm | Quality of formed products | | | | No. of pieces until build-up encountered |
|---|---|---|---|---|---|
| | Undulation μm | Warping μm | Sheet gauge diff. μm | Surface roughness Rmax μm | |
| 1.5 | 11 | 1.6 | 13 | 0.23 | 1900 |
| 2.5 | 11 | 1.7 | 12 | 0.23 | 1900 |
| 5 | 13 | 1.7 | 13 | 0.24 | 1900 |
| 10 | 13 | 1.6 | 13 | 0.24 | 1800 |
| 17 | 14 | 1.7 | 12 | 0.24 | 1800 |
| 25 | 16 | 1.8 | 14 | 0.31 | 1400 |
| 30 | 16 | 1.8 | 15 | 0.36 | 1400 |
| 40 | 17 | 1.6 | 16 | 0.44 | 1300 |
| 50 | 16 | 1.7 | 15 | 0.47 | 1300 |
| 60 | 17 | 1.7 | 16 | 0.51 | 1300 |

TABLE 9

(Influence of Surface Roughness of Compressing Surface of Dies)

| Surface roughness of compressing surface of dies Rmax μm | Quality of formed products | | | | No. of pieces until build-up encountered |
|---|---|---|---|---|---|
| | Undulation μm | Warping μm | Sheet gauge diff. μm | Surface roughness Rmax μm | |
| 0.15 | 10 | 1.5 | 12 | 0.17 | 1800 |
| 0.20 | 11 | 1.6 | 13 | 0.23 | 1800 |
| 0.50 | 11 | 1.6 | 13 | 0.53 | 1800 |
| 0.65 | 13 | 1.6 | 14 | 0.67 | 1800 |
| 0.80 | 13 | 1.7 | 13 | 0.83 | 1800 |
| 1.00 | 14 | 1.7 | 14 | 1.11 | 1800 |
| 1.50 | 14 | 1.6 | 14 | 1.56 | 1800 |
| 2.00 | 15 | 1.7 | 13 | 2.10 | 1800 |
| 3.00 | 16 | 1.7 | 14 | 3.08 | 1600 |
| 6.00 | 15 | 1.7 | 14 | 6.06 | 1500 |

TABLE 10

(Influence of Sheet Gauge Reduction Ratio)

| Sheet gauge reduction ratio m % | Quality of formed products | | | | No. of pieces until build-up encountered |
|---|---|---|---|---|---|
| | Undulation μm | Warping μm | Sheet gauge diff. μm | Surface roughness Rmax μm | |
| 0.5 | 6 | 1.1 | 10 | 0.21 | 1900 |
| 1 | 11 | 1.4 | 11 | 0.21 | 1900 |
| 2 | 10 | 1.6 | 12 | 0.22 | 1900 |
| 2.9 | 12 | 1.9 | 13 | 0.22 | 1900 |
| 3.4 | 13 | 2.0 | 13 | 0.23 | 1800 |
| 4.8 | 35 | 10.5 | 34 | 0.30 | 1500 |
| 5.7 | 39 | 13.3 | 35 | 0.31 | 1500 |
| 6.5 | 40 | 14.3 | 36 | 0.33 | 1500 |
| 7.4 | 41 | 18.0 | 37 | 0.33 | 1400 |
| 9.1 | 42 | 19.0 | 40 | 0.34 | 1400 |

As it can be seen from the above results, the trend was revealed to be similar in the case where aluminum was employed as well as in the case where aluminum alloy was employed. While the disclosure has been limited to aluminum and aluminum alloy, it will be envisaged that similar trends may be expected with other metals.

Application in Industry

As described above, since metal substrates for memory disks can be produced by a coining operation using a press, the present invention is advantageous in speeding up production rates as compared with the conventional production method which requires machining and grinding.

We claim:

1. A method of manufacturing a metal substrate used for a memory disk characterized in that a coining operation is performed under conditions wherein:
a metal blank material having surface roughness Rmax below 20 μm and coated with lubricant is sandwiched between two dies within a metal mold limiting the extent to which the material can spread, the amount of said lubricant being arranged to be less than 100 mg/m² and each of said dies having a flat and smooth compressing surface, the coining pressure (kg/mm²) being arranged to be less than 5 times the tensile strength σB (kg/mm²) of said metal blank material; and the sheet gauge reduction ratio being arranged to be below 4%, whereby the surface of the substrate is finished to be extremely smooth and flat.

* * * * *